Jan. 1, 1946.  J. R. RAPER  2,392,001
CUTTING TOOL
Filed Aug. 7, 1944
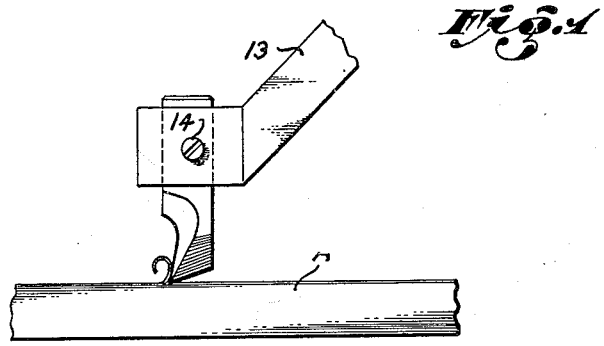
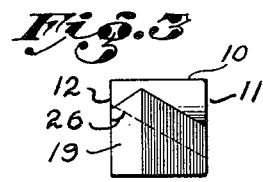
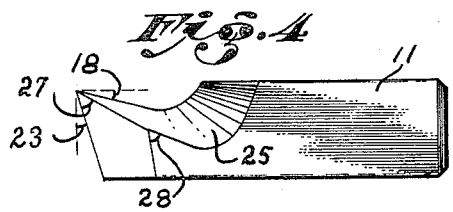
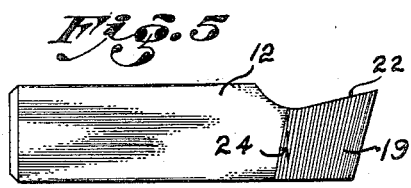
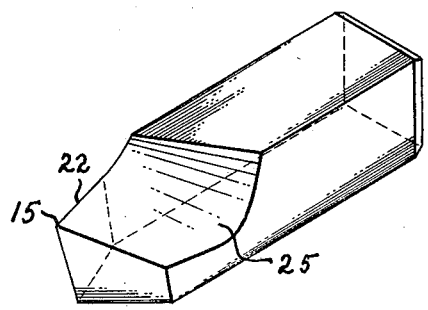
INVENTOR.
John R. Raper
BY Carlos G. Stratton
ATTORNEY Patented Jan. 1, 1946

2,392,001

UNITED STATES PATENT OFFICE 2,392,001

CUTTING TOOL

John R. Raper, West Los Angeles, Calif.

Application August 7, 1944, Serial No. 548,387

3 Claims. (Cl. 29—95)

This invention relates to machine tools and more especially to a novel cutting tool for both flat and circular work.

An object of the invention is to provide a novel cutting tool adapted primarily for roughing work, however, capable of making finished cuts.

Another object of the invention is to provide a cutting tool so designed that the number of cutting operations is reduced by virtue of the fact that the tool is capable of cutting larger chips.

An additional object is to provide an improved type of cutting tool wherein friction and smoke are minimized.

An additional object is to provide a cutting tool having an improved tortional factor wherein the chip travels upwardly and outwardly in a smooth and uniform manner.

Still other objects of my invention include providing such means that are positive in operation, convenient in use, economical of manufacture, relatively simple, and of general superiority and serviceability.

The invention also comprises novel details of construction and novel combinations and arrangements of parts, which will more fully appear in the course of the following description. However, the drawing merely shows and the following description merely describes embodiments of the present invention, which is given by way of illustration or example only.

In the drawing, like reference characters designate similar parts in the several views.

Fig. 1 is a side view of a tool embodying my invention shown making a cut in a planer.

Fig. 2 is a top view of the tool itself.

Fig. 3 is a front end view of the same.

Fig. 4 is a side elevation view of the same.

Fig. 5 is a side elevation view opposite to that of Fig. 4.

Fig. 6 is a perspective view of the tool.

Cutting tools, as heretofore designed, have had inherent objectionable features due to the improper forming thereof, as a consequence of which the chip formed has of necessity been smaller than necessary from the power requirements and the form of the chip has not been uniform and cut away smoothly, and these and other objections and disadvantages are overcome by my present invention wherein a larger chip is cut and removed in a uniform and smooth manner by the use of a tortional factor in conjunction with the proper cutting angle and back rake, all as will be more clearly apparent hereinbelow.

Referring more particularly to the drawing I show a cutting tool formed of conventional rectangular steel stock of desired hardness, the tool having a top face 10 and sides 11 and 12, Fig. 1 showing the tool secured in a suitable tool holder 13 in a planing machine, being held to the tool holder as by a lock screw 14. The tool is suitably ground to have a nose 15 forming a cutting angle 16 of substantially 60 degrees and a back rake angle 18 of substantially 13 degrees. A side face 19 is formed at an angle 20 which is substantially 30 degrees from side face 12 and forms a cutting edge 22 adapted primarily for making bevel cuts.

The tool is shown as having a front or end relief angle 23 of substantially 18 degrees and a side clearance angle 24 of substantially 10 degrees which facilitates making the bevel cuts using edge 22. As may be clearly seen in the figures, a circular groove 25 is formed with a circular grinding wheel in top face 10, the groove 25 being inclined laterally downwardly and backwardly from side 12 to side 11, the groove forming at its deepest portion an angle 26 of substantially 60 degrees from the vertical or from sides 12 or 11.

Groove 25 provides the novel tortional factor comprising an important feature of the invention whereby the chip when cut from the stock A, as seen in Fig. 1, is curved uniformly upwardly and outwardly so as to clear the cutting portion of the tool. Groove 25 cooperates with back rake angle 18 and permits the chip to be parted considerably in advance of the cutting edge in a smooth manner thus requiring less power than would ordinarily be required if the chip were broken sharply in somewhat short flat pieces as heretofore, and thus the tool of the invention is capable of making larger cuts with a given amount of power, and the surface cut is substantially a finished cut, although made as a rough cut and therefore the total number of cutting operations is materially reduced. A substantially 60 degree angle 27 is made by the face and nose 15 and a similar angle 28 is made by the chip breaker and side 11.

The tool is adapted for flat work such as planing and can also be chucked in a lathe compound for circular work and operates equally well with either type.

While I have illustrated and described what I now regard as the preferred embodiment of my invention, the construction is, of course, subject to modifications without departing from the spirit and scope of my invention. I, therefore, do not wish to restrict myself to the particular form of construction illustrated and described, but desire to avail myself of all modifications that may fall within the scope of the appended claims.

Having thus described my invention, what I claim and desire to secure by Letters Patent is:

1. A tool comprising a substantially square body having a beveled end and a beveled side, the coinciding line of said end and side being at an angle to the horizontal axis of said body and forming a nose, said body having a cut-out portion defining a plane transverse of said body and inclined from said beveled side to the opposite side of said body, the upper edge of said beveled side thereby providing an inwardly inclined cutting edge, and said body having transversely thereof a conoidally arcuate concavity, the lesser arc of said concavity being a continuation of said inclined cutting edge and the greater arc terminating on the longitudinal edge of said body substantially opposite said cutting edge.

2. A tool comprising a substantially square body having a beveled end and a beveled side, the coinciding line of said end and side being at an angle to the horizontal and providing at an end thereof a nose, said body having a reduced surface defining a plane inclined from said beveled side, and the top of said beveled side forming an inwardly inclined cutting edge, said body having a conoidally arcuate concavity extending transversely of the body from one side to the other thereof.

3. A tool comprising a body having a beveled end and beveled side, the coinciding line of said end and side being at an angle to the horizontal and providing at an end thereof a nose, said body having a transverse plane inclined from said beveled side to said beveled end, and the top of said beveled side forming an inwardly inclined cutting edge terminating in said nose, said body having a conoidally arcuate concavity adjacent said transverse plane extending transversely of said body from said cutting edge to the other side of said body.

JOHN R. RAPER.